United States Patent [19]

Bien

[11] 4,364,591
[45] Dec. 21, 1982

[54] EYELET TRIM STRIP FASTENING ARRANGEMENT

[75] Inventor: Alfred A. Bien, West Bloomfield, Mich.

[73] Assignee: Chrysler Corporation, Highland Park, Mich.

[21] Appl. No.: 256,884

[22] Filed: Apr. 24, 1981

[51] Int. Cl.³ .............................................. B60R 19/08
[52] U.S. Cl. .................................. 293/102; 293/120; 293/128; 52/716; 403/274
[58] Field of Search ........................ 293/120; 280/770; 24/230.5, 241 S, 201 HE, 251; 403/274 X; 411/500, 501; 52/716, 717, 511; 29/523, 522

[56] References Cited

U.S. PATENT DOCUMENTS 1,782,239 11/1930 Ledwinka .............................. 52/511
3,842,565 10/1974 Brown .................................. 52/716
3,982,780 9/1976 Keith ................................... 293/120

Primary Examiner—Robert R. Song
Assistant Examiner—Joseph G. McCarthy
Attorney, Agent, or Firm—Newtson & Dundas

[57] ABSTRACT

A protective flexible trim molding strip for attachment to an automotive body fascia panel. A plurality of metal grommets, each in the form of an eyelet tubular sleeve, having their outer circular head flanges cemented in a recess on the back of the molding strip. A retaining metal disc is received on each sleeve free end by means of a centrally located hole of a predetermined diameter for close contact with the sleeve outer diameter. The sleeve free end is compressed by a suitable tool applying a transverse pinching force. This force laterally expands the sleeve providing a bulbous portion capturing the disc to retain the plastic strip on body panels of varying thickness while obviating dimpling of the strip.

2 Claims, 5 Drawing Figures

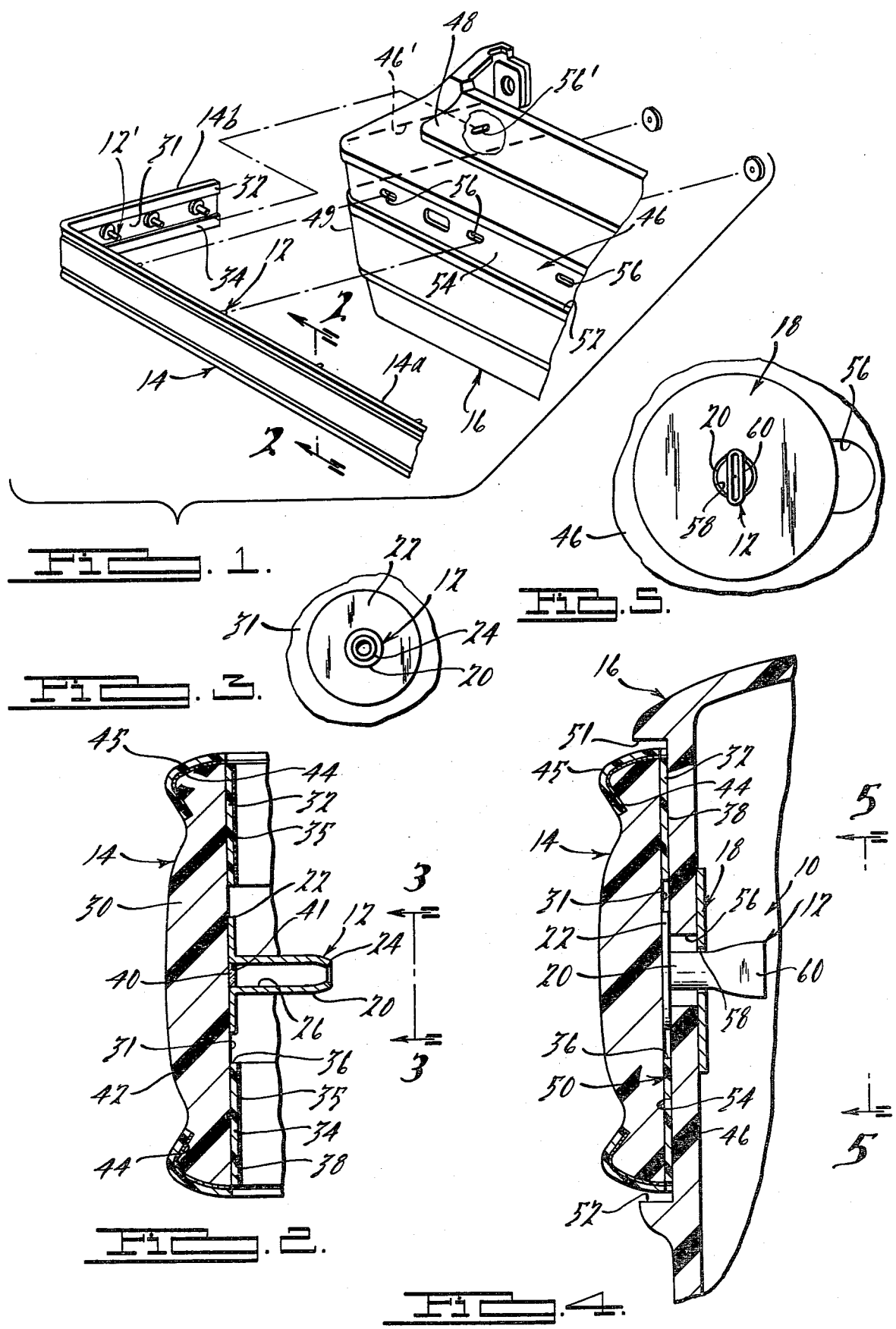

4,364,591

EYELET TRIM STRIP FASTENING ARRANGEMENT

BACKGROUND OF THE INVENTION

This invention relates generally to fastener means and more particularly to fastener devices adapted to mount a protective plastic trim strip to a body panel of a vehicle.

Various forms of fastening arrangements have been used to secure ornamental protective molding strips to automotive bodies. With the advent of plastic trim strips that are attached to a plastic body panel, such as a fascia of a bumper, a need has developed for an inexpensive non-dimpling connection to accommodate varying panel sizes. Examples of prior art trim assemblies are shown in U.S. Pat. No. 3,681,887 to Loew issued Aug. 8, 1972; U.S. Pat. No. 3,737,972 to Smoot issued to June 12, 1973 and U.S. Pat. No. 4,235,466 to Mandrik issued Nov. 25, 1980.

SUMMARY OF THE INVENTION

The mounting arrangement includes a resilient base wall fascia panel having its exposed surface formed with an elongated channel adapted to receive a one piece flexible plastic trim strip therein. The trim strip has its rear or back face provided with laterally spaced layers of adhesive material, such as pressure tape, defining a longitudinally extending recess. A plurality of metal eyelets are employed in the form of a tubular sleeve having an outer extended head flange at one end. The eyelet heads are bonded to the trim strip groove with the head recessed below the strip adhesive rear face. A series of elongated slots are provided in the plastic fascia panel with each slot adapted to receive the free end of an eyelet sleeve. A metal retainer disc is placed on the sleeve free end by means of a circular hole being of a predetermined diameter generally the same as the outer diameter of the eyelet sleeve plus a working clearance sufficient to permit the sleeve to pass through the disc hole. The sleeve free end is deformed or flattened by means of a suitable hand-tool, such as pliers, applying a pinching force thereto. The sleeve expands laterally normal relative to the direction of the force axially capturing its associated washer thereon to accommodate a range of support panel thicknesses.

A feature of the arrangement is that the eyelet provides a non-tensioning fastener retaining the molding strip on the fascia panel while allowing for production tolerance differentials. A further advantage of the invention is that the eyelets secure the molding strip without applying axial tension forces on the eyelets preventing "dimpling" of the plastic strip.

It is therefore an object of the invention to provide an improved fastening arrangement for flexible plastic molding strips adaptable for ready securing to panels of varying thicknesses while allowing the strip to accommodate impact forces and production tolerance differentials.

Still another object of the invention is that the fastening arrangement does not require the use of any special tooling.

Other more specific objects and advantages of the invention will become apparent when reference is made to the following description and accompanying drawings.

BRIEF DESCRIPTION OF THE DRAWINGS

FIG. 1 is an exploded perspective view of a trim strip attaching arrangement constructed in accordance with the teaching of this invention;

FIG. 2 is a cross-sectional view taken generally on the plane of line 2—2 illustrating the fastener and molding strip in the process of being attached to a suitable supporting panel or fascia;

FIG. 3 is a fragmentary elevational view taken on the line 3—3 of FIG. 2;

FIG. 4 is a view similar to FIG. 2 illustrating the molding strip as being attached to the supporting bumper fascia or panel; and FIG. 5 is a fragmentary elevational view taken on the line 5—5 of FIG. 4.

DETAILED DESCRIPTION

Referring now in greater detail to the drawings, a fastener arrangement 10, constructed in accordance with the teaching of this invention is illustrated in FIG. 4 as being comprised of a plurality of metal grommets or eyelets 12, a plastic trim strip 14, a supporting plate or fascia panel member 16 and a retention washer 18. The metal eyelets 12 are of conventional design and include a tubular stem or sleeve 20 provided with an outer extended circular head flange 22 at the front end, and an inwardly turned flange 24 at its opposite free end to form a shoulder, see FIG. 2. The sleeve 20 is a straight cylinder having an internal through bore 26.

The second element of the combination is the plastic trim strip 14 comprising an extruded portion 30 of plastic material such as flexible vinyl plastic. The strip back surface 31 is provided with upper 32 and lower 34 raised portions such as layers of adhesive material. In the preferred form, the adhesive material 33 and 34 comprise pressure sensitive tape, such as Neoprene for example, so that the trim strip can be adhesively applied to the fascia surface, if desired, upon protective sheet material 35 being peeled off.

The tapes 32 and 34 are laterally spaced to provide a longitudinally extending recess 36 with the recess defined by back surface 31. The back surface 31 is disposed a predetermined distance from adhesive rear surface 38 of the tapes such that the eyelet head flange 22 is disposed within the confines of the recess 36 upon being bonded to the back surface 31. The eyelet head is bonded to back surface 31 by a suitable "instant adhesive" material, such as manufactured by the Eastman Kodak Company or the Loctile Corp. It will be appreciated that the eyelet sleeve bore 26 forward open end permits the adhesive material 40 to flow therein providing an internal cylindrical bonding area 41 to insure cemented retention of the eyelet head flange 22 on the back surface 31. The trim strip outer or forward decorative surface 42 may include a metal foil 44 adhesively bonded to the strip chamfered front face or cut-away and covered by a protective layer 45 of clear PVC or cellulose-acetate butyate (CAB).

The third element of the combination is the plastic fascia panel or support member 16 which includes integral front bumper panel 46 and side bumper panel 48. The panels 46 and 48 are oriented substantially at right angles and are interconnected by a radiused or rounded corner juncture 49. The panels 46,48 include a front or rear facing channel 50 defined by upper and lower opposed channel walls 51 and 52 and channel base surface 54. The forward channel 50 is dimensional to receive trim strip 14 transverse portion 14a therein with the channel base 52 having a plurality of front slotted apertures 56.

As viewed in FIG. 1, the trim strip transverse portion 14a terminates at one curved end by a longitudinally extending portion 14b adapted to be received in a side channel portion (not shown) providing a continuation of the front channel 46. The protective trim strip transverse front portion 14a upon being impacted allows the eyelets 12 in the portion 14a to move axially relative to their associated retaining discs 18. Also, if the trim strip longitudinal side portion 14b is impacted, the eyelets affixed thereto are free to move axially relative to their associated discs in channel portion 46'. Further differences in thermal expansion between the trim strip transverse and longitudinal portions 14a and 14b and their associated channel portions 46 and 46' will be accommodated by the invention's mounting arrangement.

FIGS. 4 and 5 show the relationship of the metal disc or washer 18 relative to the eyelet head flange 22. It will be noted that the washer forward or inner surface engages the fascia panel 46 rear or inner surface over a projected area substantially larger than the surface area of the eyelet head flange that engages the back surface 31 of the trim strip. This enables the trim strip fastening arrangement to withstand impact and rebound forces on the flexible fascia panel 46.

The fastening arrangement 10 further allows the disc 18 to be axially retained on the eyelet sleeve 20 while permitting some axial movement of the disc 18 relative to the sleeve 20. The result is that during installation of the strip a zero tension force is applied to the eyelet sleeve and flange head. The advantage to such an arrangement is that by avoiding tension forces on the eyelet sleeve 20 the fastener 12 does not exert or apply any axial force on the plastic trim strip 14. This prevents dimple "marks" or depressions being formed in the outer decorative surface 42 of the strip.

What is claimed is:

1. A protective plastic molding strip for attachment to a vehicle body panel comprising, in combination, a panel member having outer and inner surfaces;

a plastic molding protective trim strip adapted to be mounted on said panel outer surface;

said molding strip having its back face formed with a pair of transversely spaced pressure sensitive tapes defining a longitudinally extending recess having a predetermined depth;

a plurality of connecting eyelets each having an outer extended circular head flange portion and an axially extending tubular sleeve portion, said head flange portion having a thickness generally the same as but less than the recess depth;

each said eyelet head flange portion planar face adhesively bonded to the strip recess;

said panel member having a plurality of spaced openings each dimensioned for the passage of an eyelet sleeve portion;

each said eyelet having a metal retention disc on said panel inner surface, each disc having a predetermined diameter such that it engages said panel inner surface over an area substantially larger than the surface area of its associated eyelet head flange, the discs formed with a centrally located circular hole being of a predetermined diameter generally the same as the outer diameter of said eyelet sleeve plus a working clearance sufficient to permit the sleeve to pass through the disc hole; and means for expanding the free end of each said eyelet sleeve by applying a transverse pinching force thereto to form a laterally expanded bulbous portion for engagement with the outer surface of its associated disc to prevent axial displacement of said disc while allowing some axial movement of said disc relative to said sleeve whereby the molding strip is adapted for mounting on panels of various thicknesses.

2. The combination as recited in claim 1 wherein each said eyelet tubular sleeve includes an axial bore the forward open end of which permits adhesive material to bond therewith to insure cemented retention of the eyelets on the strip.

* * * * *